Patented June 20, 1950

2,511,830

UNITED STATES PATENT OFFICE 2,511,830

SEALING COMPOUND

Albert C. Fischer and William H. Walker, Chicago, Ill.; said Walker assignor to said Fischer No Drawing. Application February 2, 1945,
Serial No. 575,935

2 Claims. (Cl. 106—122)

This invention relates to a sealing composition and more particularly to a sealing composition characterized by a high degree of yieldability, elasticity, cohesive force and the capability of tenacious adhesion therebetween and adjacent bodies of the same or different material which is not affected by extremely low temperatures and particularly temperatures ranging from 0° to 15° F.

It is the object of the present invention to provide a sealing composition containing a polymerized oil, preferably polymerized linseed oil, as a base material, having rubbery properties but which nevertheless is comparatively plentiful as a substitute for the rubber constituent of rubber bituminous mixtures which have been used heretofore. With this polymerized oil may be combined asphalt or resin constituents and small proportions of plasticizing agents and fillers such as an oily flux consisting of a heavy crude oil and asbestos dust, clay and the like.

When resins such as coumarone-indene are employed in lieu of the asphalt constituent, colored pigmenting agents may be added for the purpose of matching any colors of the structural elements sought to be sealed by the composition in accordance with the present invention; whereas in cases where asphalt is used, the sealing compound is colored black, which is capable of use in those places where this characteristic presents no objection.

It is the object of the present invention to provide a sealing composition which requires no primer in conjunction therewith to effect an adhesion between the composition and the surfaces of the spaces in which the composition is poured. The adhesion between the body of the sealing composition and the walls is maintained under all temperature conditions which renders the composition particularly useful in the sealing of joints between concrete under the severest atmospheric conditions. The sealing composition in accordance with the present invention may be used economically in the fabrication of expansion joints for concrete constructions wherein the same may be used as a capping strip over expansion joints or fibrous material of all types. When the sealing composition is poured above the main body of the expansion joint, to the depth of one to two inches, the adhesive force between the body of the sealing composition and the end surfaces of the structural sections of the expansion joint is sufficient to maintain the integrity of the joint at the upper portion thereof despite any permanent contraction of the expansion joint material below the capping strip. Therefore, the entry of moisture and sand into the expansion joint from the upper surface of the roadway is positively excluded by the effective seal at the upper surface thereof and this efficiency is attained in conjunction with the economical use of a comparatively small amount of the sealing composition, namely of a depth of less than two inches in comparison to the approximately ten or twelve inches of fibrous sheeting material which occupies the remainder of the expansion joint space between the concrete sections.

The fact that an effective bond is maintained under all temperature conditions between the contacting surfaces of the sealing compound and the sections being sealed, without the necessity of any priming operations, results in manufacturing economies in the fabrication and joining of the structural sections in which such sealing medium is used.

It is a further object of the invention to provide a plastic composition containing a polymerized oil of rubbery nature and a bituminous asphalt or resin, together with a plasticizing agent, a mineral filler and a flow retarding agent, which ingredients are compounded in such a manner as to produce a homogeneous product having the texture of licorice sticks, which may be distended when pulled, but which in contradistinction to conventional bituminous rubber mixtures, has marked restoring forces which render the composition ideally suited to expansion joint uses. Aside from the strong cohesive force existing between the molecules of the composition, to produce a yieldable and highly elastic substance, the material has a tacky texture which is effective in adhesively engaging bodies of other materials such as concrete, metal and wood to adhere thereto in the course of following the movements of these materials as is the case of expansion joints. Also the waterproof sealing joints obtainable with this material render it useful in the field of contraction joints.

It is a further object of the invention to provide a composition which is described above, which may be cut with suitable solvents and emulsifying agents to produce waterproofing coatings and emulsions such as paints, dampproofing compounds and the like.

One of the principal advantages of the present invention is the retention of the properties of the material described above, such as yieldability, elasticity, adhesive tenacity, waterproofness, etc., at freezing temperatures, at which such products normally become brittle and lose their efficacy in the applications for which such materials are used.

The material in accordance with the present invention may be formed or extruded, or molded into different shapes which are particularly adapted to expansion joints and keying means used in connection with such joints. The same may also be used in large masses which may be liquefied by the application of a controlled amount of heat thereto preparatory to the pouring thereof into expansion joints or other molded forms. This material is particularly useful in the field of expansion joints by virtue of its capability of sealing the joint against the ingress of water to the subsoil of a pavement or roadway, which is effective under all temperature conditions and which is capable of being restored to its original state and position upon the recurrence of normal temperatures. Its capability of maintaining a bond at the jointing surface thereof to the pavement sections after the melted composition is poured into the joint and is permitted to harden assures the maintenance of the integrity of the expansion joints in which the same is used. This property of the material, which may be designated as its "elastically cohesive property," enables the composition to be extended to a marked degree upon the application of forces thereto, which upon the release of the latter permits the material to revert to its former form, while the material possesses the property of adhering to surfaces adjoining it with such tenacity that this extension takes place without releasing its hold on the surfaces in contact therewith.

Other objects and purposes will appear from the following detailed description of the preferred embodiments and their manner of execution.

The sealing medium in accordance with the present invention is preferably compounded by combining approximately 26% to 35% of a polymerized oil such as linseed oil with 35% to 45% of an asphalt, designated asphalt B. This mixture is executed at normal room temperature in one-half to one hour. A crude oil, constituting a flux for the mixture, is then added to an extent of 16% to 25%, and residual asphalt oil in a heated state at 260° to 280° F. is used for this purpose and is blended into the mixture until a homogeneous mass is obtained. Inert fillers are then added, such as clay 3% to 5%, asbestos shorts amounting to 0.5% to 1.5%, and exfoliated vermiculite 1.5% to 3.5%. These fillers are mixed into the mass until a uniform consistency is attained. The total time required for the mixture of a batch is approximately five hours and the only heat required by the operation is the self-generated heat resulting from the mixture and the heat content of the flux. Following the setting of the composition the same is packaged in boxes or bags and is shipped to points of utilization where the same may be heated in crucibles and poured for the purpose of filling crevices or expansion joint spaces. If desired, the material can be molded in strips and placed between heated surfaces, or the sides of the strips may be heated to bring up the material to its melting point in which state it exercises its adhesive force to provide a tight bond between the sealing compound and the surface or surfaces of the material to which the same is bonded.

The ingredients above may be purchased on the open market and compounded as described above to obtain different blends of the composition adapted to be used for different purposes. One formula which has proven particularly useful is of the following composition:

|  | Per cent |
| --- | --- |
| Polymerized vegetable oil | 32.6 |
| Asphalt B | 38.0 |
| Residual asphalt oil | 21.6 |
| Clay | 4.0 |
| Asbestos | 1.1 |
| Expanded vermiculite | 2.7 |

The asphalt B has the following properties:

Melting point (A. S. T. M. ring and ball), 175°–190° F.

Ductility (A. S. T. M. 77° F. 5 cm. per min.), 4 cm.–8 cm.

Penetration (77° F. 100 gms. 5 sec's, A. S. T. M.), 0.12 cm.–0.20 cm.

Penetration (32° F. 200 gms. 60 sec's, A. S. T. M.), 0.22 cm.–0.18 cm.

The residual asphalt oil is an oily asphalt of a viscous liquidy nature of the type from which the heavier asphalts are blown, characterized by the following properties:

Ductility, 77° F., 5 cm. per min., 45 cm. to 60 cm.
Penetration, 32° F., 200 grms., 60 sec., .66 cm.

The material is too soft to take a penetration at 77° F. with a standard needle, and is also too soft to take a melting point reading with ring and ball.

Exfoliated vermiculite is a puffed vermiculite material having the approximate formula $$3MgO\text{---}(FeAl)_3O_3.3SiO_2$$

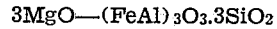

The exfoliated vermiculite plaster aggregate is used in the above compositions, but if a coarser product is desired, the exfoliated vermiculite concrete aggregate may be used.

Any inert pulverized clay capable of passing an 80 mesh screen may be used for the clay ingredient and any asbestos dust, preferably of the short fiber type, such as Canadian 7R, may be used for this class of filler.

When sealing compounds of various colors are desired, the polymerized oil is combined with coumarone indene resins of sufficiently light color that the same may be modified by suitable pigmenting agents. These resins are selected so that the oxidizing qualities thereof do not affect the bonding qualities of the ultimate sealing composition so that the latter do not become brittle in use and at low temperatures.

The sealing compound in accordance with the present invention possesses the following characteristics and properties, which may be tested in the following manner:

The material shall be suitable for melting in the usual type of asphalt kettle. It shall melt easily to a pouring consistency when uniformly heated to a temperature not exceeding 420° F. and shall adhere to the sides of the walls of monolithic material forming the joint. The material shall not crack inherently or break its bond with the walls when exposed to low temperatures and extended.

Detailed requirements

A sample of the material shall comply with the following detailed requirements when the tests are applied as described below.

(a) Pouring fluidity (pour point)—Shall not exceed a temperature of 420° F.

(b) Melting time—Shall not exceed 1 hour
(c) Cold adhesion test—Positive
(d) Flash point—More than 550° F.
(e) Penetration, in centimeters at 77° F., 150 gram, 5 sec.—0.45 to 0.75; 32° F., 200 gram, 60 sec.—More than 0.28
(f) Flow in centimeters, 5 hrs. at 140° F. at 75° angle—0.5 maximum
(g) Bond test, 5 cycles at 15° F.—Shall not crack or break its bond
(h) Softening point, deg. F.—Above 160° F.

Test procedure (a) 200 grams of material cut into approximately 1" cubes is placed in an ordinary #2 open top can (3¼" diameter, 4½" height), submerged 3½" into an oil bath maintained at 450° F. (+5°). The material is considered at its pour point (minimum pouring temperature) when it can be readily poured. It shall be of a uniform consistency, capable of being poured into a half-inch joint.

(b) Melting time is considered the time necessary for the material to reach its poured point.

(c) *Cold adhesion test.*—One cubic inch of material at room temperature (77° F.) cut from unmelted sample with a cold knife is placed between dry specified bond test blocks free of dust. It is then compressed to one-half of its thickness and maintained in that position for six hours.

1. The material must "wet" the block surface and consequently an adhesive bond must result.

2. It is then cooled for one hour at 0° F., and immediately subjected to a tensile test up to 200 pounds, and it shall not break its bond.

(d) *Flash point* according to A. S. T. M. designation: D92-33.

(e) *Penetration test.*—Two samples of the material shall be poured according to A. S. T. M. designation D5-25 at its pour point, stirred with hot knife and allowed to cool at room temperature for two hours, after which both are transferred to their respective baths maintained at 77° F. and 32° F. (+2° F.) both allowed to remain two hours, after which the samples are tested for penetration with a grease cone (A. S. T. M. designation D217-33T).

The penetration at 77° F. will be made with total weight of 150 grams and for a period of five seconds.

The penetration at 32° F. will be made with total weight of 200 grams and for a period of sixty seconds. The reported penetrations shall be the average of at least three tests.

(f) *Flow test.*—A portion of the molten sample shall be poured at its pour point into a mold placed on a clean tin panel. The dimensions of mold are ⅛" x 1½" x 2½" (+.01"). It is then allowed to cool for 30 minutes at 77° F. and then trimmed. Test piece shall be maintained at 140° F. (+2°) in a constant temperature oven for five hours at an incline of 75°. The flow of the material is measured from start to finish in centimeters.

We claim:

1. An adhesive tacky sealing compound containing approximately 32.6% polymerized linseed oil, approximately 38.0% asphalt having a melting point of 175° to 190° F., 21.6% residual asphalt oil, 4.0% clay, 1.1% asbestos dust and 2.7% exfoliated vermiculite.

2. An elastically cohesive sealing composition adapted to be bonded in situ and capable of maintaining bond at sub-freezing temperatures, comprising a homogeneous mixture of 26% to 35% rubbery polymerized vegetable oil, 35 to 45% of thermoplastic asphaltic material having a melting point of 175° to 190° F., 15 to 25% residual asphalt oil, and 5 to 10% finely divided solid material, said composition having a pouring fluidity at a temperature not exceeding 420° F. and a softening point above 160° F., and capable of maintaining bond at 15° F.

ALBERT C. FISCHER.
WILLIAM H. WALKER.

REFERENCES CITED

The following references are of record in the file of this patent:

UNITED STATES PATENTS

| Number | Name | Date |
|---|---|---|
| 1,212,428 | Watson | Jan. 16, 1917 |
| 1,268,031 | McCoy | May 28, 1918 |
| 1,371,016 | Bennett et al. | Mar. 8, 1921 |
| 1,643,021 | Luyties | Sept. 20, 1927 |
| 1,822,636 | Winkelmann | Sept. 8, 1931 |
| 1,972,390 | Miner | Sept. 4, 1934 |
| 2,077,094 | Byers | Apr. 13, 1937 |
| 2,163,553 | Fischer | June 20, 1939 |